US010697578B2

(12) United States Patent
Gooris et al.

(10) Patent No.: US 10,697,578 B2
(45) Date of Patent: Jun. 30, 2020

(54) METHOD FOR ASSEMBLING A RIGID CONDUIT AND ASSOCIATED CONDUIT

(71) Applicant: TECHNIP FRANCE, Courbevoie (FR)

(72) Inventors: François Gooris, Saint Cloud (FR); Sébastien Viale, Le Chesnay (FR); Philippe Espinasse, Bihorel (FR); Olivier Rageot, Paris (FR); Laure Boustany, La Varenne Saint-Hilaire (FR)

(73) Assignee: TECHNIP FRANCE (FR)

( * ) Notice: Subject to any disclaimer, the term of this patent is extended or adjusted under 35 U.S.C. 154(b) by 59 days.

(21) Appl. No.: 15/769,150

(22) PCT Filed: Oct. 21, 2016

(86) PCT No.: PCT/EP2016/075399
§ 371 (c)(1),
(2) Date: Apr. 18, 2018

(87) PCT Pub. No.: WO2017/068135
PCT Pub. Date: Apr. 27, 2017

(65) Prior Publication Data
US 2018/0306376 A1    Oct. 25, 2018

(30) Foreign Application Priority Data

Oct. 22, 2015    (FR) ..................................... 15 60097

(51) Int. Cl.
*F16L 59/14*    (2006.01)
*F16L 59/02*    (2006.01)
*F16L 9/14*    (2006.01)

(52) U.S. Cl.
CPC ............... *F16L 59/143* (2013.01); *F16L 9/14* (2013.01); *F16L 59/02* (2013.01)

(58) Field of Classification Search
CPC ............ F16L 59/143; F16L 9/14; F16L 59/02
(Continued)

(56) References Cited

U.S. PATENT DOCUMENTS 3,654,061 A * 4/1972 Berwanger ........... F16L 59/027
428/157
3,745,621 A    7/1973 Andrews et al. ............. 29/33 D
(Continued)

FOREIGN PATENT DOCUMENTS

DE    24 12 003 A1    9/1975
EP    0 063 869 A2    11/1982
(Continued)

OTHER PUBLICATIONS

International Search Report dated Jan. 19, 2017 in corresponding PCT International Application No. PCT/EP2016/075399.
(Continued)

*Primary Examiner* — Craig M Schneider
*Assistant Examiner* — David R Deal
(74) *Attorney, Agent, or Firm* — Ostrolenk Faber LLP

(57) ABSTRACT

A method for assembling a rigid pipe intended to be placed in a body of water, the rigid pipe including a metallic inner tube, a thermally insulating insulation jacket formed from an assembly of insulating parts and an outer layer. The method includes the steps of providing the metallic inner tube, forming the insulation jacket, and forming the outer layer around the insulation jacket. The method includes a step for providing a plurality of helical insulating parts and a step of mounting the helical insulating parts around the inner tube in order to form the insulation jacket.

12 Claims, 5 Drawing Sheets

(58) Field of Classification Search
USPC .......................................................... 138/149
See application file for complete search history.

(56) References Cited

U.S. PATENT DOCUMENTS

| | | | | |
|---|---|---|---|---|
| 4,218,814 | A * | 8/1980 | Hodapp ................. | B29C 63/18 |
| | | | | 138/121 |
| 4,304,268 | A * | 12/1981 | Gilman .................. | B29C 53/60 |
| | | | | 138/129 |
| 4,781,089 | A | 11/1988 | Gerber et al. ..................... | 83/51 |
| 5,573,040 | A * | 11/1996 | Schumacher ....... | B28B 19/0023 |
| | | | | 138/144 |
| 5,645,110 | A * | 7/1997 | Nobileau ................ | F16L 9/147 |
| | | | | 138/102 |
| 6,102,077 | A * | 8/2000 | Legallais ................ | F16L 11/22 |
| | | | | 138/115 |
| 6,530,137 | B1 * | 3/2003 | Dewimille ............ | F16L 59/153 |
| | | | | 29/527.2 |
| 6,940,054 | B1 | 9/2005 | Heggdal ....................... | 219/629 |
| 2003/0005971 | A1 * | 1/2003 | Dewimille ............ | F16L 59/027 |
| | | | | 138/126 |
| 2006/0196568 | A1 * | 9/2006 | Leeser ...................... | F16L 9/18 |
| | | | | 138/149 |
| 2010/0260551 | A1 * | 10/2010 | Jespersen ................ | F16L 59/22 |
| | | | | 405/158 |
| 2011/0197987 | A1 * | 8/2011 | Koravos ................ | F16L 59/026 |
| | | | | 138/149 |
| 2015/0079316 | A1 * | 3/2015 | Pernell .................. | F16L 59/022 |
| | | | | 428/34.1 |

FOREIGN PATENT DOCUMENTS

| | | |
|---|---|---|
| EP | 2 327 920 A1 | 6/2011 |
| FR | 2 163 497 A1 | 7/1973 |
| FR | 2 343 196 A1 | 9/1977 |
| GB | 2 388 641 A | 11/2003 |
| WO | WO 2014/188183 A1 | 11/2014 |

OTHER PUBLICATIONS

Written Opinion dated Jan. 19, 2017 in corresponding PCT International Application No. PCT/EP2016/075399.
Preliminary Search Report dated Jun. 14, 2016 in corresponding French Patent Application No. 1560097.

* cited by examiner

METHOD FOR ASSEMBLING A RIGID CONDUIT AND ASSOCIATED CONDUIT

CROSS-REFERENCE TO RELATED APPLICATIONS

The present application is a 35 U.S.C. §§ 371 national phase conversion of PCT/EP2016/075399, filed Oct. 21, 2016, which claims priority to French Patent Application No. 1560097, filed Oct. 22, 2015, the contents of which are incorporated herein by reference. The PCT International Application was published in the French language.

TECHNICAL FIELD

The present invention relates to a method for assembling a rigid pipe intended to be placed in a body of water, the rigid pipe comprising a metallic inner tube, a thermally insulating insulation jacket formed from an assembly of insulating parts and an outer layer, the method comprising the following steps:
  providing the metallic inner tube,
  forming the insulation jacket, and
  forming the outer layer around the insulation jacket.

Such a method is intended for manufacturing rigid hydrocarbon transport pipes in a body of water.

BACKGROUND OF THE INVENTION

Transporting hydrocarbons in a body of water involves a temperature drop due to the heat exchanges with the surrounding environment. Indeed, the hydrocarbons go from a temperature of about 50° C. to 150° C. in the reservoir to a temperature of around several degrees. This temperature drop may lead to an increase in the viscosity of the hydrocarbons, causing a decrease in the flow rate within the pipes or the formation of hydrates and paraffins, which often cause blockages of the pipes.

To offset this temperature drop, double-jacketed pipes ("pipe in pipe") have been developed. In this type of conduit, the fluid is transported through an inner tube that is in turn located inside an outer tube providing passive thermal insulation.

This solution was improved by adding, to the passive thermal insulation, active heating of the conduits by winding heating cables directly around the inner tube ("Electrically Trace Heated Pipe-in-Pipe", ETH-PiP).

However, such a solution is expensive and the steel double jacket of such a pipe represents a relatively heavy weight, which makes installation difficult, in particular at great depths.

An alternative solution making it possible to resolve these problems is described in document U.S. Pat. No. 6,940,054.

This document describes a thermally insulated tube surrounded by heating cables and electrical cables. The tube comprises thermal insulation means intended to reduce heat exchanges with the surrounding environment. The insulation means comprise inner and outer members wound around the tube. The outer and inner members form longitudinal channels making it possible to accommodate the heating cables. Around the outer insulating members, an outer strap is wound intended to keep the inner and outer insulating members around the tube.

In the manufacturing method described in U.S. Pat. No. 6,940,054 4B1, the very long insulating parts are wound in a spiral around the inner tube to form an insulation jacket.

The formation of the jacket by winding the insulating parts requires a rotating machine, allowing the insulating parts to be placed in a spiral, described in the document.

This type of device is very bulky and cumbersome. It is not possible to assemble the pipe on a site that does not have one, a fortiori on board a vessel for placing the rigid pipe.

Furthermore, some assembly sites are not configured to accommodate such a type of device. The assembly of a rigid pipe by such a method is therefore not possible on all assembly sites.

Lastly, these devices are expensive, as is building new sites suitable for receiving them.

SUMMARY OF THE INVENTION

One aim of the invention is to propose a method for assembling a thermally insulated rigid pipe that is simple and inexpensive to carry out and does not require using heavy machines for assembling the insulation jacket.

To that end, the invention relates to a method of the aforementioned type, characterized in that the method comprises a step for providing a plurality of helical insulating parts and a step of mounting the helical insulating parts around the inner tube in order to form the insulation jacket.

The method according to the invention may comprise one or more of the following features, considered alone or according to any technically possible combination:
  a prior step for cutting an insulating tube into helical insulating parts before the mounting step;
  during the cutting step, the insulating tube is cut in its thickness into several insulating parts in a stairstep profile to obtain insulating parts having at least one stair-forming edge;
  during the step for cutting the insulating tube, the insulating tube is cut into at least three helical insulating parts;
  a step for offset superposition of two insulating parts to form a helical insulating section provided with at least one stair-forming edge;
  the insulating parts are superimposed before the mounting step;
  the two superimposed insulating parts are assembled on one another to form, before they are mounted, insulating sections that can be manipulated as a single piece;
  a step for superimposing insulating parts, such that each insulating part comprises a first side edge and a second side edge, the first side edge being situated below a first adjacent insulating part and the second side edge being situated above a second adjacent insulating part;
  the insulating parts have a length comprised between 1 m and 4 m;
  the step for forming the outer layer comprises a step for providing at least one outer strap and a step for winding the outer strap around the insulating parts;
  the step for forming the outer layer comprises a step for at least partially melting the outer strap after the step for winding the outer strap; and
  the helical insulating parts have a helix angle relative to a longitudinal axis of the internal tube comprised between 0° and 75°, the helix angle being different from 0°.

The invention also relates to a rigid pipe, comprising:
a metallic inner tube,
an insulation jacket formed by assembled insulating parts,
an outer layer formed with insulating parts; the insulating parts are helical.

The pipe according to the invention may include one or more of the following features, considered alone or according to any technically possible combination(s):
  the helical insulating parts are obtained by cutting an insulating tube; and
  two helical parts are superimposed offset on one another to form a helical section provided with at least one stair-forming edge.

The present invention also relates to a method for assembling a rigid pipe intended to be placed in a body of water, the rigid pipe comprising a metallic inner tube, a thermally insulating insulation jacket formed from an assembly of insulating parts and an outer layer, the method comprising the following steps:
  providing the metallic inner tube,
  forming the insulation jacket, and
  forming the outer layer around the insulation jacket, characterized in that the method comprises a step for providing a plurality of insulating parts and a step of mounting the insulating parts around the inner tube in order to form the insulation jacket,
and in that the method includes a prior step for cutting an insulating tube into insulating parts before the mounting step.

The insulating parts are not necessarily helical. They for example have parallel straight side edges.

The method according to the invention may comprise one or more of the following features, considered alone or according to any technically possible combination:
  during the cutting step, the insulating tube is cut in its thickness into several insulating parts in a stairstep profile to obtain insulating parts having at least one stair-forming edge;
  during the step for cutting the insulating tube, the insulating tube is cut into at least three insulating parts;
  a step for offset superposition of two insulating parts to form an insulating section provided with at least one stair-forming edge;
  the insulating parts are superimposed before the mounting step;
  the two superimposed insulating parts are assembled on one another to form, before they are mounted, insulating sections that can be manipulated as a single piece;
  a step for superimposing insulating parts, such that each insulating part comprises a first side edge and a second side edge, the first side edge being situated below a first adjacent insulating part and the second side edge being situated above a second adjacent insulating part;
  the insulating parts have a length comprised between 1 m and 4 m;
  the step for forming the outer layer comprises a step for providing at least one outer strap and a step for winding the outer strap around the insulating parts;
  the step for forming the outer layer comprises a step for at least partially melting the outer strap after the step for winding the outer strap.

The invention also relates to a rigid pipe, comprising:
  a metallic inner tube,
  an insulation jacket formed by assembled insulating parts,
  an outer layer arranged around insulating parts;
  the insulating parts being formed by cutting an insulating tube.

The insulating parts are not necessarily helical. They for example have parallel straight side edges.

The pipe according to the invention may include one or more of the following features, considered alone or according to any technically possible combination(s):
  two insulating parts are superimposed offset on one another to form a section provided with at least one stair-forming edge.

BRIEF DESCRIPTION OF THE DRAWINGS

The invention will be better understood upon reading the following description, provided solely as an example and done in reference to the appended drawings, in which.

DESCRIPTION OF PREFERRED EMBODIMENTS

The terms "above" and "below" referring to elements of the pipe are defined radially relative to a central axis of the pipe. The term "below" is to be understood as closer to the axis X, and the term "above" is to be understood as further away.

Within the meaning of the present invention, an element is generally "metallic" when more than 50% by weight of this element is made from metal. It is generally "nonmetallic" when 50% or less by weight of this element is made from metal.

Figure 1:
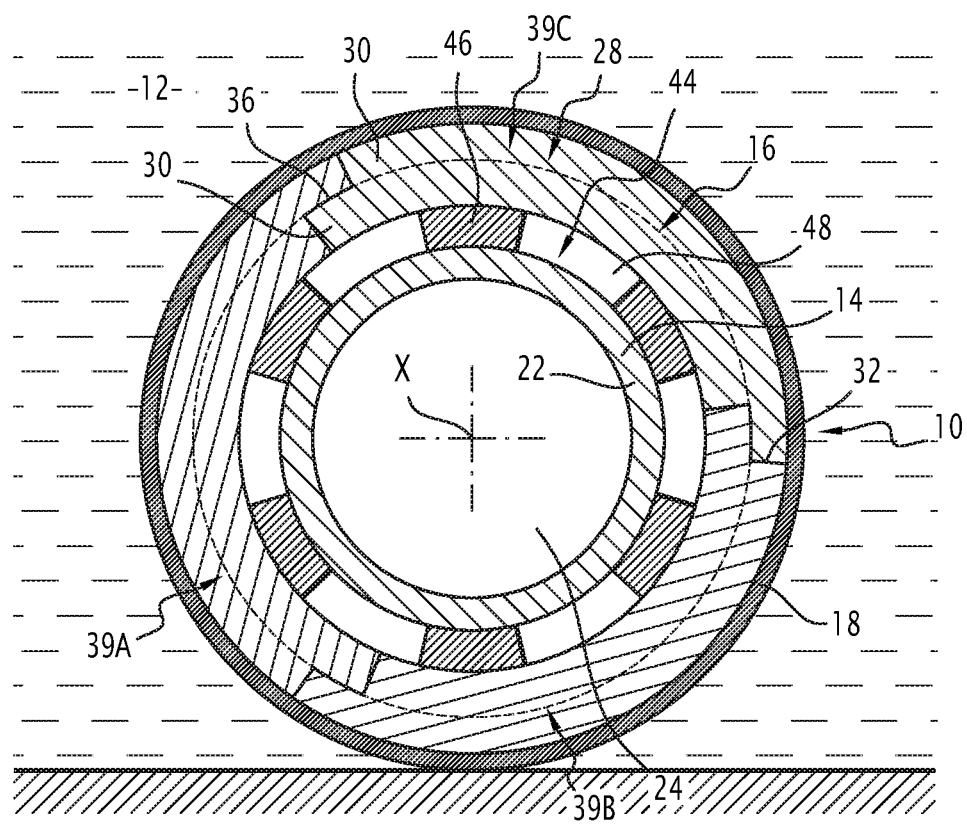
FIG. 1 is a sectional schematic view of one embodiment of a pipe according to the invention.
Figure 2:
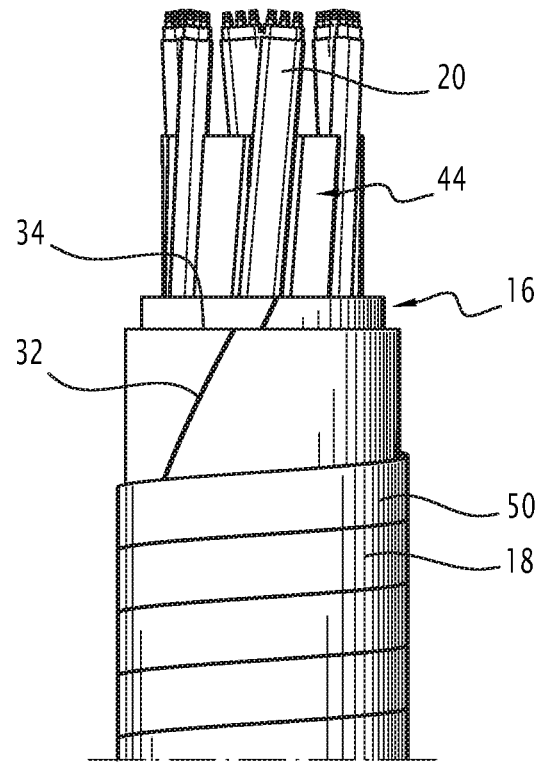
FIG. 2 is a schematic side view with partial cutaway of the pipe of FIG. 1.

A first rigid pipe 10 for transporting fluid manufactured by an assembly method according to the invention is partially illustrated by FIGS. 1 and 2.

The rigid pipe 10 is intended to be submerged in a body of water 12, to transport a fluid through the body of water 12.

The rigid pipe 10 is for example placed on the bottom of the body of water 12 to connect a fluid collection installation, such as a well, to an assembly for conveying fluid toward the surface. Alternatively, the rigid pipe 10 extends through the body of water 12, from the bottom of the body of water 12 toward the surface.

The body of water 12 is for example a sea, ocean, lake or river. The depth of the body of water 12 is generally greater than 10 m, and is for example comprised between 100 m and 5000 m.

The fluid withdrawn and conveyed by the rigid pipe 10 is in particular a hydrocarbon, such as oil or natural gas.

As illustrated by FIGS. 1 and 2, the rigid pipe 10 includes a metallic inner tube 14, a nonmetallic thermally insulating insulation jacket 16 arranged around the metallic inner tube 14 and an outer layer 18 arranged around the insulation jacket 16. The outer layer 18 is intended to come into contact with the body of water 12 in which the pipe 10 is submerged.

The rigid pipe 10 further includes at least one functional line 20, here a heating line, arranged outside the metallic inner tube 14.

The inner tube 14 includes an end-to-end assembly of tube segments 22. It defines a continuous inner passage 24 for the circulation of the fluid through several tube segments 22, between the ends of the pipe 10.

The inner tube 14 for example has an outer diameter comprised between 10 cm and 130 cm. The outer diameter of the inner passage 24 is for example comprised between 8 cm and 127 cm.

The inner tube 14 has a longitudinal axis X. The inner passage 24 extends along the longitudinal axis X.

Each tube segment 22 is made with a base of metal, for example steel, stainless steel and other types of steel with a variable nickel content or combination of these materials.

The steel tube segments 22 are for example inwardly coated with stainless steel, a corrosion-resistant metal alloy (such as Inconel® 625 or 835, for example) or a plastic. Typically, the thickness of the coating is comprised between 1 mm and 7 mm, and generally substantially equal to 3 mm.

Each tube segment 22 has a length advantageously comprised between 12 m and 96 m.

The segment 22 is advantageously outwardly provided with a protective layer, such as an epoxy layer bonded by melting.

In addition to the epoxy layer or as an alternative to this layer, the segment is provided with an outer protective layer made from polyethylene (PE) or polypropylene (PP). This layer has a thickness comprised between 2 mm and 4 mm.

The ends of each pair of adjacent tube segments 22 are fastened to one another at a junction to form a continuous tube 14. This fastening is for example done by welding.

Alternatively, the inner tube 14 is formed by a single segment substantially having the length of the rigid pipe.

The insulation jacket 16 has a thickness comprised between 20 mm and 180 mm.

The insulation jacket 16 comprises at least one insulating layer 28.

At least one insulating layer 28 of the insulation jacket 16 is formed by several insulating parts 30. The insulating parts 30 are arranged around the circumference of each segment 22 of the tube 14 to receive it.

At each transverse section of a segment 22, the insulating layer 28 advantageously comprises at least three insulating parts 30. This in particular makes it possible to grip the inner tube 14 and to facilitate the assembly of the pipe by pressing the insulating parts on the tube. The placement of the insulating layer 28 during the assembly of the pipe does not require a heavy assembly machine.

Depending on the diameter of the inner tube 14, the insulating layer 28 for example comprises between 3 and 6 insulating parts.

The insulating parts 30 have thermal insulation properties. The insulating parts 30 are made from a thermally insulating material, in particular a polymer, for example a polyolefin (PP or PE) or a polyurethane (PU), or a filled polymer, for example a polypropylene (PP) filled with glass beads. The thermal conductivity of the insulating material is for example less than 0.4 W/(m·K), advantageously less than 0.2 W/(m·K).

In one particular embodiment, the insulating parts 30 are for example made from a different material depending on the layer to which they belong. The insulating parts closest to the inner tube 14 are made from solid PP. The insulating parts furthest from the inner tube 14 are made from PP filled with glass beads or syntactic PP foam, for example, when the pipe is intended to be used at shallow and/or medium depths, i.e., for depths of less than 1000 m.

The insulating parts 30 are arranged adjacent to one another. The insulating parts 30 are for example spaced apart by a circumferential allowance, comprised between 0% and 20% of the circumference of the outer layer. The presence of a circumferential allowance in particular makes it possible to offset a heterogeneity in the size of the inner tube 14 and/or the insulating parts 30.

The insulating parts 30 have a helical shape. The insulating parts 30 are for example in the form of a blade wound in a helix.

As will be seen below, each insulating part 30 is formed by longitudinally cutting a tube of insulating material along helical cutting lines.

Advantageously, the largest dimension of each insulating part 30 is smaller than the length of a segment 22 of the inner tube 14. Thus, insulating parts 30 are placed end-to-end along the inner tube 14 to cover the inner tube 14. The largest dimension of each insulating part 30 is smaller than 4 m, and preferably comprised between 1 m and 4 m. Thus, an insulating part can be manipulated by an operator.

The thickness of the insulating parts 30 is defined radially relative to the longitudinal axis X.

The thickness of the insulating parts 30 is for example comprised between 10 mm and 90 mm.

Each insulating part 30 has two longitudinal edges 32 and two transverse edges 34.

The length of each insulating part 30 is equal to the average of the lengths of its longitudinal edges 32.

The width of each insulating part 30 is defined similarly to the length with the transverse edges 34.

The length of each insulating part 30 is greater than its width.

The longitudinal edges 32 form an angle $\alpha$, called helix angle, with an axis parallel to the longitudinal axis X of the inner tube 14. The helix angle is comprised between 0° and 75°, the helix angle being different from 0°, and more particularly between 1° and 75°.

In the example illustrated in FIGS. 1 and 2, the transverse edges 34 of the insulating parts 30 are straight.

The insulation jacket 16 comprises at least two insulating layers formed from insulating parts, here called lower layer and upper layer. The two insulating layers advantageously have the same number of insulating parts.

Figure 3:
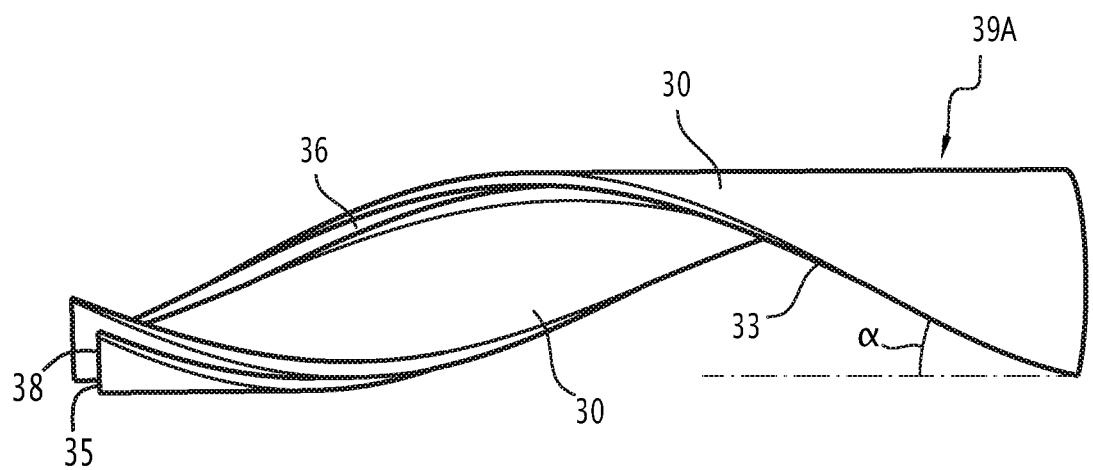
FIG. 3 is a perspective view of two superimposed insulating parts according to one embodiment of the pipe.

Each insulating part of the upper layer is superimposed with a certain offset on an insulating part of the lower layer, as shown in FIG. 3. The offset is circumferential and/or along the helix axis.

The circumferential offset is for example comprised between 3% and 50% of the dimension of the insulating part. In other words, the overlap between the insulating part of the upper layer and the superimposed insulating part of the lower layer is comprised between 50 and 97%.

Optionally, the superimposed insulating parts are assembled on one another.

Each pair of superimposed insulating parts 30 forms of insulating section 39A, one of which is shown in FIG. 3.

The superimposed insulating parts here have substantially the same shape, with straight edges.

Each insulating section 39A then defines at least one longitudinal 33 and/or transverse 35 edge in stair form or with a longitudinal step 36 and/or a transverse step 38.

As shown in FIG. 2, the longitudinal steps 36 of two adjacent insulating sections 39A, 39B have complementary shapes and are interlocked in one another.

Likewise, the transverse steps 38 of two end-to-end insulating sections have complementary shapes and are interlocked in one another.

This arrangement limits heat transfers by convection from the water at discontinuities. It improves the mechanical strength of the insulating parts 30.

In one embodiment, the insulation jacket 16 comprises other insulating layers, for example formed from non-helical insulating parts.

Advantageously, the insulation jacket 16 comprises a discontinuous inner layer 44.

The discontinuous jacket 44 is formed from separate insulating parts 46.

The insulating parts 46 are made from a polymer material, for example polypropylene (PP), polyethylene (PE) or polyurethane (PU).

Each insulating part 46 has a width comprised between $1/16^{th}$ and one quarter of the circumference of the inner tube 14. It has a thickness comprised between 5 mm and 60 mm.

The separate insulating parts 46 define slots 48 between them. The slots 48 are intended to receive the functional line(s) 20.

The slots 48 are flooded with sea water or inhibited water, i.e., including corrosion-inhibiting agents such as amine compounds.

In the example shown in FIG. 2, the insulating parts 46 are helical and define helical slots 48.

The discontinuous layer 44 is the layer of the insulation jacket 16 closest to the inner tube 14.

Alternatively, the parts of the discontinuous layer 44 are not insulating. The discontinuous layer 44 is then located between the inner tube 14 and the insulation jacket 16.

The outer layer 18 comprises at least one outer strap 50, advantageously between one and four superimposed outer straps 50.

The outer strap 50 is for example made from high- or medium-density polymer such as polyethylene (PE) comprising fibrous fillers such as aramid or poly(p-phenyleneterephthalamide) (PPD-T) fibers.

The width of the outer strap 50 is comprised between 50 mm and 400 mm.

The outer strap 50 is wound helically around the insulation jacket 16 with a winding angle with a small pitch for example comprised between 1° and 80° with the axis X. The outer strap 50 is wound with an overlap comprised between 0% and 80%.

If there are multiple outer straps 50, they are for example wound with different, or even opposing, winding angles.

Advantageously, the outer strap 50 is made from a nonmetallic material. It is partially or completely melted.

The outer strap 50 provides upholding to ensure the integrity of the pipe.

The functional line 20 is for example an electric line able to perform a heating function by electric tracing on the inner tube 14, outside the inner tube 14. It is placed in thermal contact with the outer surface of the inner tube 14, either by being placed directly against the metallic surface of a tube segment 22, or by being placed on the protective layer when this layer is present.

The functional line 20 is for example made by a bundle of cables or conductive wires or a metallic tube with a hydraulic function and/or a reinforced and tight cable accommodating optical signal and temperature control fibers of the distributed (DTS) or semi-distributed (Bragg) type.

The different electrical conductors of the functional line 20 are received in a metallic and/or plastic sheath with a thickness substantially equal to 1 mm.

The optical fibers are received in a metallic sheath with a plastic anti-corrosion coating.

In the example shown in FIG. 2, it has an elongated cross-section with a width larger than its thickness.

The functional line 20 here is arranged in the slots 48 of the discontinuous layer 44.

The functional line 20 is arranged in a helix. The helix pitch of the functional line 20 is identical to the helix pitch of the insulating parts 46.

The functional line 20 extends continuously along the pipe 10, along at least two adjacent tube segments 22, advantageously along about 50% of the tube segments 22 of the pipe 10.

The line 20 also extends continuously across from each junction between two adjacent tube segments 22.

The line 20 thus has a length greater than that of a segment 22, advantageously greater than that of at least two segments 22. It is therefore not necessary to provide electrical connectors on the line 20 between each pair of adjacent segments 22 at the junction.

It also has a length greater than that of each insulating part 30.

Figure 4:
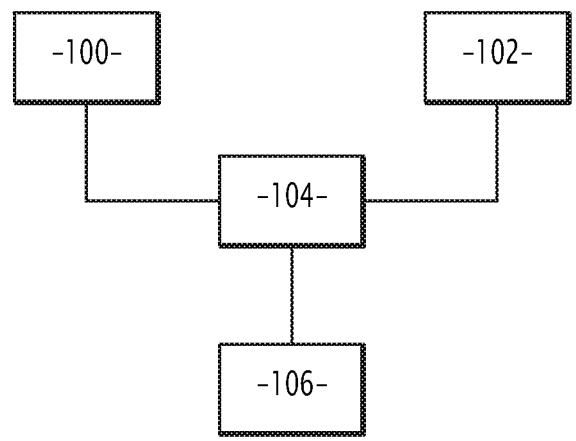
FIG. 4 is a block diagram of one embodiment of the method according to the invention.

A method for assembling a rigid pipe 10 as previously described will now be described, in reference to FIG. 4.

The method comprises the following steps:
a step 100 for providing an inner tube 14,
a step 102 for providing insulating parts 30, forming them from an insulating tube,
a step 104 of mounting the insulating parts around the inner tube 14 to form the insulation jacket, and
a step 106 of forming the outer layer 18.

Initially, in step 100, an inner tube 14 as previously described is provided.

The inner tube 14 is provided in a single segment 22 or in several segments 22.

If there are multiple segments 22 to be assembled, one end of a second segment is placed across from the free end of a first assembled tube segment. Then, a junction is done between these two tube segments, for example by welding ends between them. The anticorrosion coating at the welding area is then reformed. Next, the assembly thus produced is moved to add a new tube segment.

Alternatively, the segments are assembled over the course of the mounting step 104.

During step 102 for providing insulating parts 30, a plurality of insulating parts 30 are produced, and preferably at least three for each length of the inner tube 14 to be covered.

Advantageously, the insulating parts 30 are made by cutting from a tube of insulating material by a machine 200 during a cutting step.

The insulating tube has a main axis D. It has a length smaller than that of a segment 22 of the inner tube 14.

The machine comprises a system for guiding the tube 202 and a plurality of cutting tools 204.

The guiding system 202 has a guiding axis Z. The guiding system is able to move forward the insulating tube in translation along the guiding axis.

The guiding system for example comprises at least one rail 206 along the axis Z and a support 208 mounted on wheels 210 provided to move on the rail 206.

The support 208 is able to maintain the insulating tube, such that the guiding axis Z and the main axis D of the insulating tube are parallel.

The support 208 for example comprises two parts. Each part is for example placed at one end of the insulating tube and maintains the tube using adjustable jaws 211. The distance between the two parts is adjustable relative to the insulating tube to be cut.

The support 208 is able to move in translation along the guiding axis Z on the rail 206, for example using a rack 214 activated by a dedicated motor.

The guiding system is also capable of rotating the insulating tube around its main axis at an adjustable rotation speed.

The guiding system 202 for example comprises a motor 212 mounted on the support 208 and able to rotate the insulating tube.

The cutting tools 204 are placed around the main axis D.

The cutting tools 204 are able to cut the insulating tube introduced into the machine. The cutting tools 204 are for example circular or band saws, water jets or lasers.

The machine 202 for example comprises three identical saws placed substantially at 120° from one another around the axis D at a distance substantially equal to the radius of the insulating tube.

In one embodiment, the machine 202 comprises cooling nozzles with water or pulsed air at the cutting tools.

The method for producing insulating parts 30 will now be described.

Before the cutting step, the insulating tube is advantageously placed in a drying oven for 20 to 30 minutes, for example, at a temperature relatively close to the melting temperature of the polymer. The temperature at the center of the material is thus homogenized, which prevents deformations of the cut parts due to the relaxation of stresses in the material. The tube is next cooled before being cut.

The insulating tube is inserted into the machine 202, such that its main axis D is parallel to the guiding axis Z.

The insulating tube is then translated along the guiding axis Z.

To obtain helical insulating parts, the insulating tube is rotated around its main axis D during the translation.

The rotation and translation speeds are in particular chosen relative to the desired helix angle of the part.

The cutting tools cut the insulating tube into several insulating parts with straight edges.

The insulating parts 30 have a maximum length comprised between 1 m and 4 m. The insulating parts 30 are thus able to be manipulated by operators or a mechanical means to assist with lifting and handling. The mechanical means is of the type comprising hydraulic jacks arranged at the bottom of the insulating parts and controlled arms for assistance or weight reduction arranged on the sides of the insulating parts.

In one embodiment, the insulating tube has a length greater than the maximum desired length for the insulating parts. The tube is then also cut along at least one radial plane. This step is carried out before or after cutting in a helix.

They can be stored after manufacturing near a station for mounting the insulation jacket 16 on the inner tube 14.

After the steps for providing an inner tube 100 and insulating parts 102, the mounting step 104 takes place.

First, a discontinuous layer 44, as previously described, is placed on the inner tube 14. The insulating parts 46 of the discontinuous layer 44 are placed angularly spaced apart from one another. They define slots 48 between them.

The slots 48 are flooded with sea water or inhibited water, i.e., water including corrosion-inhibiting agents such as amine compounds.

At least one functional line 20 is arranged in the slots 48. Each line 20 is unwound from a spool and inserted into a slot 48. The line 20 is unwound in rotation around the inner tube 14, for example similarly to the method described within document FR 2,948,164 A1. The line 20 is optionally pressed against the inner tube 14 with a pushing member.

The insulating parts 30 are then mounted around the discontinuous layer 44 to form a first layer. They are simply assembled to one another by placing them side by side, with an optional circumferential allowance, and applying them on the layer just below. They surround the tube 14 over at least a circumference around the axis X, then other insulating parts 30 are mounted at the axial ends of each insulating part to cover an increasing length of the tube.

Multiple layers can thus be mounted around the inner tube by applying them each time on the parts of the layer just below.

In one particular embodiment of the method, the insulation jacket 16 comprises at least two non-discontinuous insulating layers. The two insulating layers, here called upper layer and lower layer, advantageously have the same number of insulating parts 30, having substantially the same shape.

Before the mounting step 104, each insulating part of the upper layer is superimposed on an insulating part of the lower layer so as to form insulating sections 39A, 39B, 39C.

The superposition is done with a certain circumferential 36 and/or longitudinal 38 offset. Each insulating section is thus provided with at least one edge 32, 34 in stair form.

The superimposed insulating parts are advantageously glued, thermosealed or assembled to one another using a fastening means such as screws or rivets in order to form the insulating sections 39A, 39B, 39C.

The insulating part of the upper layer is for example kept in a pattern. The inner face, intended to be in contact with the insulating part of the inner layer, is kept upward.

Glue or heating spots are done in different locations of the inner face.

The insulating part of the lower layer is next superimposed with the insulating part of the upper layer with a given offset.

A jack or a weight keeps the insulating part of the lower layer pressed against the inner face of the insulating part of the upper layer, until adhesion or fusion of the spots.

During a mounting step 104, the superimposed insulating parts are mounted by insulating section 39A, 39B, 39C around the inner tube 14, similarly to the mounting step previously described.

After the mounting step 104, the inner tube 14 is surrounded by the insulation jacket 16. The insulation jacket 16 is kept around the tube 14 during mounting via the plastic or metallic strap.

The step 106 of forming the outer layer 18 then takes place.

At least one outer strap 50, as previously described, is provided. The outer strap 50 is wound around the insulation jacket 16, for example using a winder. The placement tension of the outer strap 50 is for example comprised between 500 kg and 1000 kg for straps with a width substantially equal to 130 mm.

The outer strap 50 is then heated to a given temperature, for example using a laser or a hot air gun. The temperature is for example comprised between 100° C. and 150° C. This causes partial or complete melting of the outer strap with itself or in adjacent outer strap.

The strap here is partially melted over the entire circumference of the pipe at regular intervals, for example comprised between 1 m and 15 m. The partial melting is done here every 3 m, 6 m or 12 m with forced stop points every 200 m to 500 m.

At the end of step 106 of forming the outer layer 18, the rigid pipe 10 is usable directly.

The method is easy to implement and does not require heavy assembly machinery.

The helical shape in particular makes it possible to improve the behavior of the insulating parts when the latter are wound and/or unwound for reel-lay placement of the pipe and to minimize, or even eliminate, the fact that the insulating parts 30 are only supported on one side above the slots 48 receiving the functional line 20.

Figure 5:
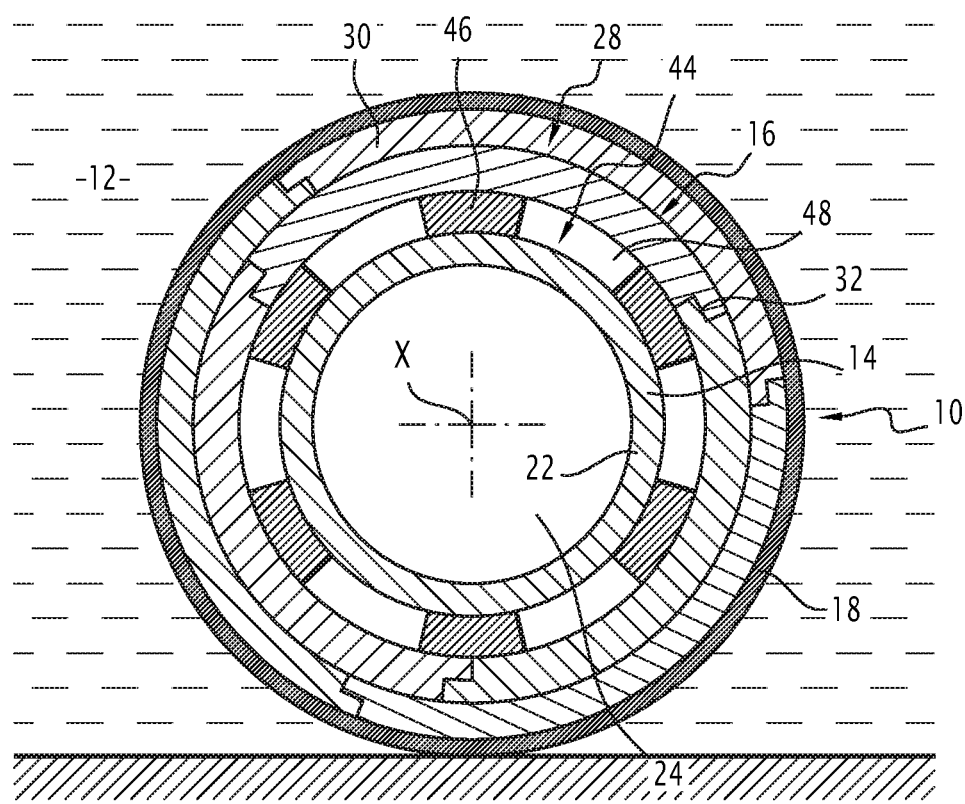
FIG. 5 is a sectional schematic view of another embodiment of a pipe according to the invention.
Figure 6:
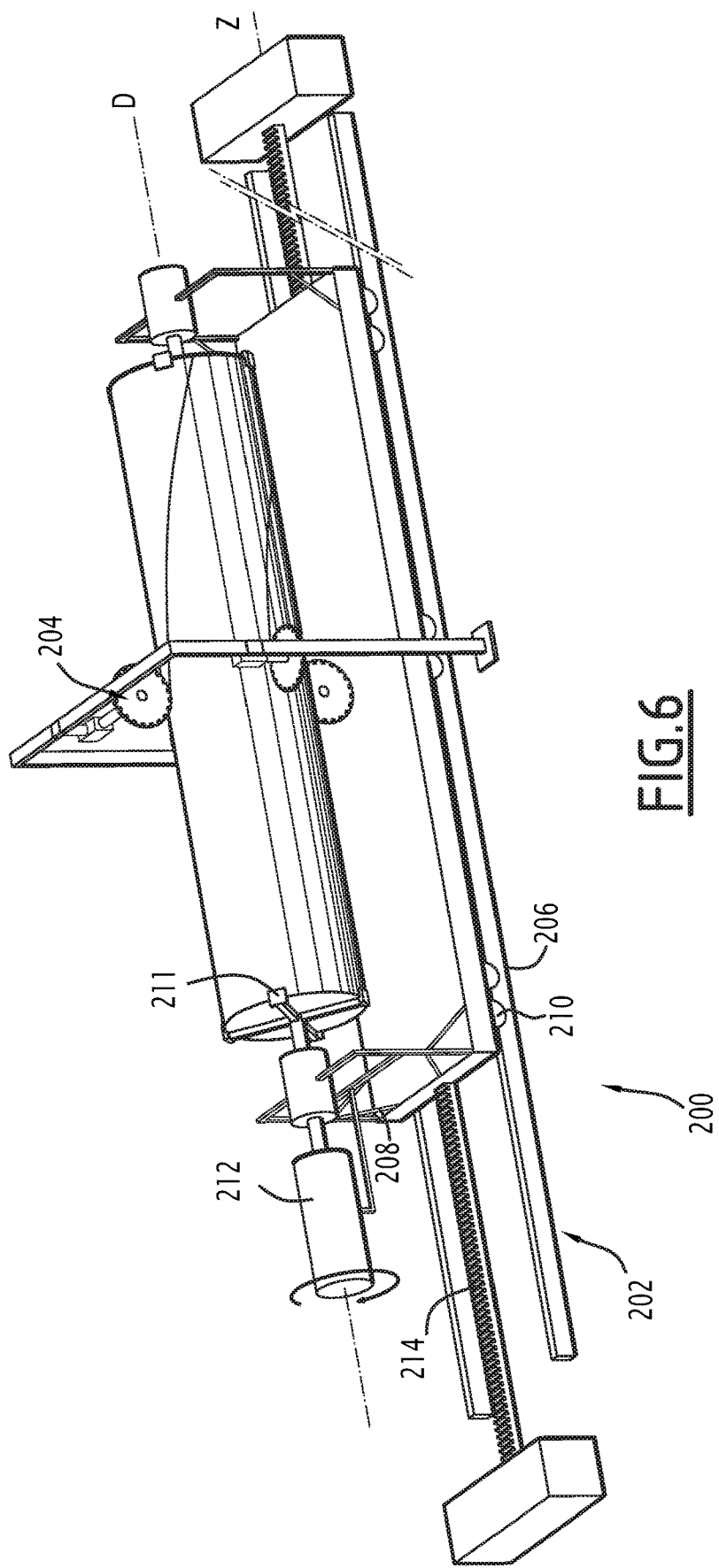
FIG. 6 is a schematic perspective view of a machine able to cut and insulating tube into helixes.

In an alternative shown in FIG. 5, the longitudinal edges 32 of the insulating parts 30 have a stair shape, i.e., the insulating parts 30 have a staircase-shaped profile.

The longitudinal edges 32 of each insulating segment then have a circumferential step 36.

The adjacent edges of two adjacent insulating parts have complementary shapes.

During the step for cutting the insulating tube, the machine is suitable for cutting the insulating tube with a staircase-shaped profile in order to obtain insulating parts having at least one longitudinal edge with a stair shape. The cutting tools of the machine are thus suitable for cutting in a staircase shape.

The machine for example comprises, in place of each cutting tool, a set of three blades, a first and second blade which are parallel to each other and a third perpendicular blade, joining the two parallel blades. The two parallel blades perform radial cutting of the tube. The third blade cuts the insulating tube in a plane tangential to the tube.

The first parallel blade extends outward from the third blade. The second parallel blade extends inward from the third blade.

As an alternative to the described guiding system, the machine 202 comprises two worm screws at the ends that allow the translational movement of the insulating tube to be cut.

In another alternative, to replace the step for cutting the insulating parts of the method as previously described, the insulating parts 30 are molded directly in the desired shape.

The longitudinal 32 and/or transverse 34 edges are molded straight or so as to form a circumferential 36 and/or longitudinal 38 step.

In one embodiment, the insulating parts 46 are extruded or molded flat. They are next shaped hot in a helix on a gauge.

Alternatively, the method for manufacturing insulating parts 46 is identical to the method for manufacturing insulating parts 30 of the insulating enclosure, for example by cutting an insulating tube in a helix.

As an alternative to the method previously described, during the mounting step 104, at least one layer is assembled such that each of its insulating parts is partially superimposed with the adjacent insulating parts, and not placed side by side.

During the mounting step 104, the first side edge of each insulating part is placed below a first adjacent insulating part and the second side edge of the insulating part is placed above a second adjacent insulating part.

The insulation jacket 16 in this embodiment comprises between two and four insulating layers, each having a thickness from 10 mm to 15 mm.

The insulating layers are made with a flexible material, for example syntactic polyurethane foam.

The application of the outer strap 50 is done with a higher tension than before, for example up to two times higher. The tension during the application of the outer strap is for example substantially equal to 2000 kg.

The rest of the method is similar to what has been described previously.

In another embodiment, the pipe does not comprise a functional line 20. The insulating parts 46 are then joined, i.e., there are no slots 48.

In an alternative to the method previously described, the pipe does not comprise a discontinuous layer 44. The functional line 20 is then placed around and in contact with the inner tube 14, before the placement of the insulating parts 30 around the inner tube 14.

In another embodiment, the functional line 20 is arranged before the placement of the insulating parts 46.

Figure 7:
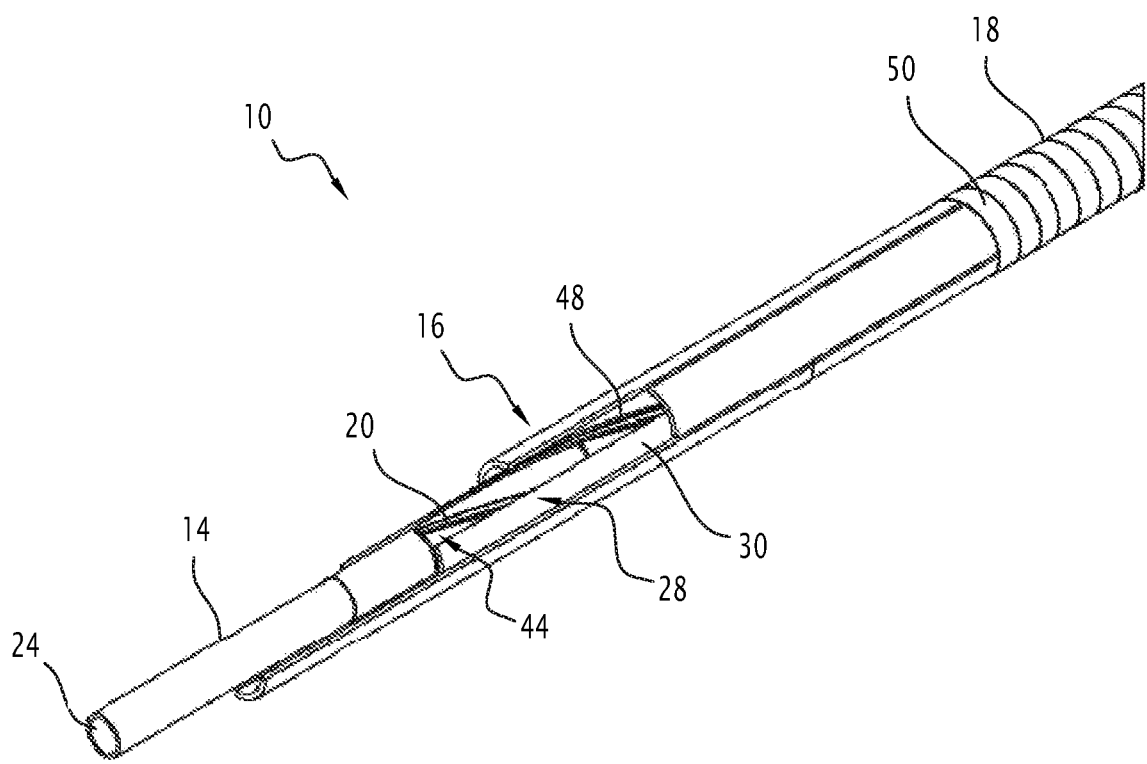
FIG. 7 is a partially exploded perspective view of another pipe.

The entire method is also suitable for cases where the insulating parts 30 are not helical as illustrated by FIG. 7. The steps 100 for providing an inner tube, mounting 104 and forming 106 the outer layer are similar. Step 102 of providing insulating parts 30 differs if the insulating parts 30 are made by a step for cutting an insulating tube by the fact that the insulating tube is not rotated during the cutting. The insulating parts 30 then have straight side edges.

It is also interesting to superimpose the non-helical insulating parts in pairs from two different layers with a given offset to obtain a circumferential or longitudinal step.

In the invention described above, the helical parts are assembled successively on the pipe, while being able to be manipulated directly by operators or robots. The method according to the invention is therefore very easy to implement. It does not require complex tools, in particular a rotating winder. It is then possible to perform the assembly directly on the assembly bases and to perform the placement by reel-lay. It is also suitable for S-lay mounting.

According to the alternative in which the pipe does not comprise a functional line 20, advantageously, the insulating parts 46 delimit circumferential allowance between them.

In another alternative, the outer layer 18 is a sheath. The latter is in particular formed by extrusion.

Furthermore, the outer layer 18 can be permeable. For example, the thickness of the sheath is small enough to allow surrounding water to pass. Alternatively, the outer layer 18 is impermeable. A valve system is advantageously provided to allow flooding of the slots 48, for example.

The invention claimed is:

1. A method for assembling a rigid pipe intended to be placed in a body of water, the rigid pipe, in an assembled state, comprising a metallic inner tube, a thermally insulating insulation jacket formed from an assembly of helical insulating parts and an outer layer, the method comprising the following steps:
   cutting an insulating tube into helical insulating parts,
   providing the metallic inner tube,
   forming the thermally insulating jacket around the metallic inner tube by mounting the cut helical insulating parts around the metallic inner tube, and
   forming the outer layer around the insulation jacket.

2. The method according to claim 1, wherein during the cutting step, the insulating tube is cut in its thickness into several insulating parts in a stairstep profile to obtain insulating parts having at least one stair-forming edge.

3. The method according to claim 1, wherein, during the step for cutting the insulating tube, the insulating tube is cut into at least three helical insulating parts.

4. The method according to claim 1, comprising a step for offset superposition of two insulating parts to form a helical insulating section provided with at least one stair-forming edge.

5. The method according to claim 4, wherein the insulating parts are superimposed before the mounting step.

6. The method according to claim 4, wherein the two superimposed insulating parts are assembled on one another to form, before they are mounted, insulating sections that can be manipulated as a single piece.

7. The method according to claim 1, comprising a step for superimposing insulating parts, such that each insulating part comprises a first side edge and a second side edge, the first side edge being situated below a first adjacent insulating part and the second side edge being situated above a second adjacent insulating part.

8. The method according to claim 1, wherein the insulating parts have a length comprised between 1 m and 4 m.

9. The method according to claim 1, wherein the step for forming the outer layer comprises a step for providing at least one outer strap and a step for winding the outer strap around the insulating parts.

10. The method according to claim 9, wherein the step for forming the outer layer comprises a step for at least partially melting the outer strap after the step for winding the outer strap.

11. The method according to claim 1, wherein the helical insulating parts have a helix angle relative to a longitudinal axis of the internal tube comprised between 0° and 75°, the helix angle being different from 0°.

12. The method according to claim 1, further comprising connecting the mounted helical insulating parts to form the thermally insulating jacket.

\* \* \* \* \*